UNITED STATES PATENT OFFICE.

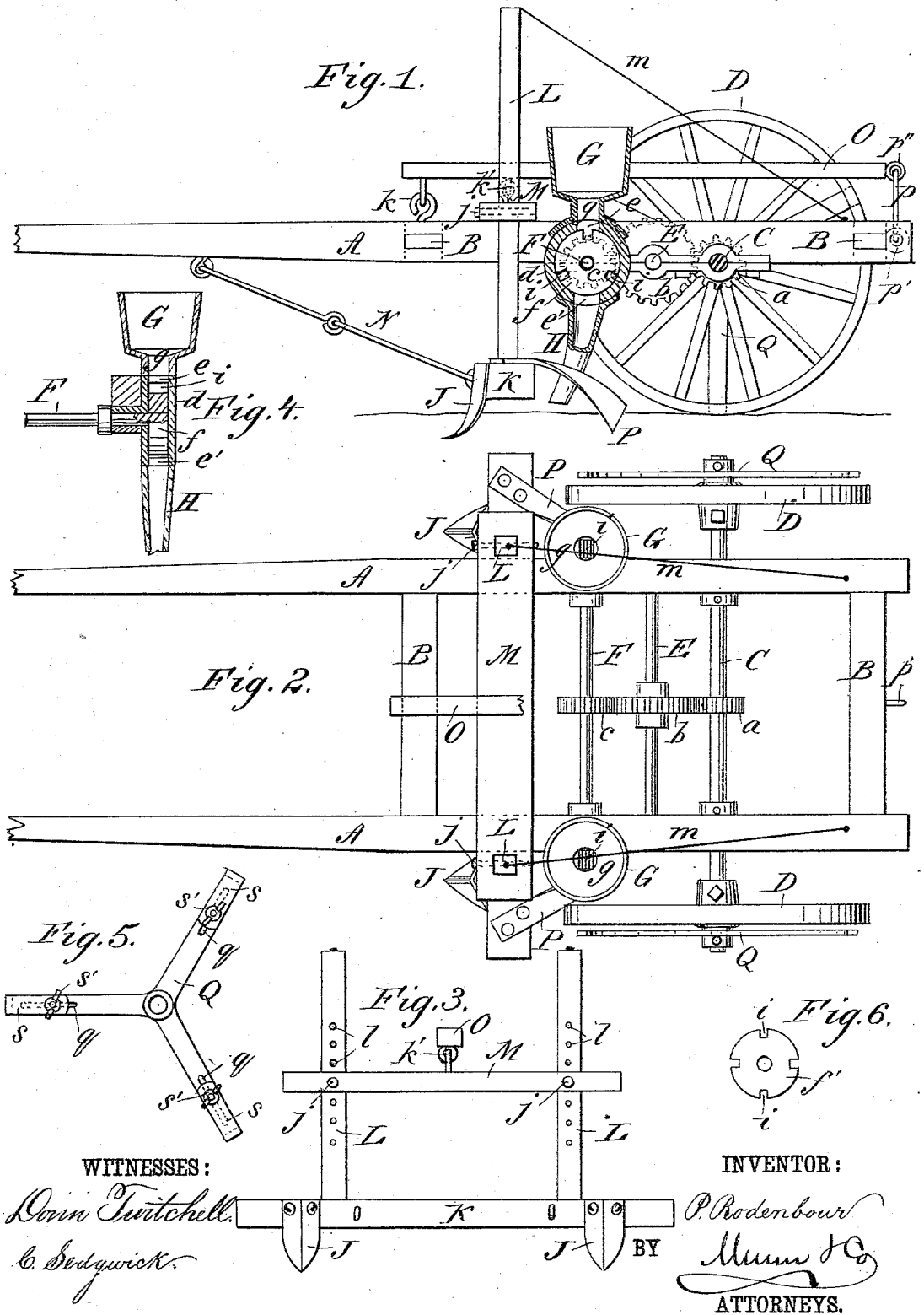

PETER RODENBOUR, OF QUINCY, ILLINOIS.

CORN-PLANTER.

SPECIFICATION forming part of Letters Patent No. 286,557, dated October 9, 1883.

Application filed November 20, 1882. (No model.)

*To all whom it may concern:*

Be it known that I, PETER RODENBOUR, of Quincy, in the county of Adams and State of Illinois, have invented a new and Improved Corn-Planter, of which the following is a full, clear, and exact description.

Reference is to be had to the accompanying drawings, forming part of this specification, in which similar letters of reference indicate corresponding parts in all the figures.

Figure 1 is a sectional side elevation of my improved corn-planter. Fig. 2 is a plan view of the same. Fig. 3 is a front elevation of the plow-point frame removed from the main frame of the planter. Fig. 4 is a detailed sectional elevation of the seed-hopper, seed-dropping wheel, and spout. Fig. 5 is a front elevation of the marker for indicating the hills removed from the main axle of the planter, and Fig. 6 is a side view of one of the seed-dropping wheels.

The invention will first be described in connection with the drawings, and then pointed out in the claims.

The main frame of the planter is composed of the side bars, A A, that are extended forward to form the thills, and the cross-bars B B, which tie the bars A A together in front and rear of the working parts of the planter. This main frame rests upon the main axle C, which is journaled between suitable pillow-blocks and plates bolted to the bars A and to the ends of the axle. Outside of the bars A A are secured the drive-wheels D D, which are by preference about four feet in diameter.

To the center of the main axle C is secured the small cog-wheel or pinion $a$, which meshes with the cog-wheel $b$ on the intermediate shaft E, and this latter meshes with cog-wheel or pinion $c$, secured upon the shaft F. The pinions $a$ and $c$ are of the same size, so that the shaft F will have the same speed or revolution as the axle C.

To the ends of the shaft F are attached the seed-dropping wheels $f f$, which are formed with the square recesses $i\ i$, and which revolve in the hollow castings $d\ d$.

G G are the seed-hoppers, which are attached to the hollow castings $d\ d$, so that their throats $g\ g$ coincide with the openings $e\ e$ in the hollow castings $d$, as clearly shown in Figs. 1 and 4, and attached to the under side of the castings $d\ d$, immediately below the outlet-openings $e'\ e'$ therein, are the spouts H H, through which the seeds are conducted from the recesses $i\ i$ to the furrows made in the soil by the plow-points J J. These plow-points are attached to the bar K, which is suspended under the main bars A A by means of the upright arms L L and upper cross-piece, M, which rests upon the bars A A, the arms being attached to the cross-bar M by means of the pins $j\ j$. The arms L L pass up through the cross-bar M, as shown in Fig. 2, and are made vertically adjustable therein for raising or lowering the plow-points by means of the series of holes $l\ l$ made in the arms, as shown in Fig. 3, to receive the pins $j$. The plow-points are held to their work by the jointed connecting-rods N N, which are attached to the bar K and to the under side of the bars A A, as shown in Fig. 1, and these connecting-rods, being jointed, permit the bar K to be raised by raising the outer end of the lever O for raising the plow-points clear of the ground while turning the planter at the ends of the rows. The forward end of the lever O is linked to the forward cross-bar B of the main frame of the planter by the link $k$ and to the bar M by the link $k'$, as shown in Fig. 1, and the rear end of the lever is adapted to be held down for holding the plow-points in the ground by means of the hook $p$, attached to the rear cross-bar B of the main frame by the staple $p'$ and the eye $p''$ at the end of the lever.

P P are the curved covering-blades, which are bolted to the bar K and reach back and run in contact with the ground in rear of the spouts H H, as shown in Figs. 1 and 2, for covering the hills; and Q Q are tri-armed markers attached to the hubs of the drive-wheels, or to the main axle outside of the hubs, for marking the ground to indicate where the hills are, so that the corn may be planted in straight rows both ways. The outer ends of the arms of the markers are slotted, as shown at $q\ q$, and are provided with the plates $s\ s$, which are secured to the arms by the screws $s'\ s'$, which pass through the slots, so that the plates may be adjusted to enter the ground a greater or less distance, as required for making a distinct mark.

Arranged as shown in Fig. 1, the drive-wheels being four feet in diameter, and the dropping-wheels $ff$ made with three recesses, the machine will drop three times at each revolution of the drive-wheels, and will make the hills just four feet apart. If it is desired to make the hills closer together, the dropping-wheels $f'$, Fig. 6, with four recesses will be substituted for the dropping-wheels with three recesses, and there will be several sets of interchangeable dropping-wheels, having recesses of different numbers and sizes, to go with each machine, so that each machine will be adapted to plant all kinds of grain, and there will also be as many sets of interchangeable markers as there are sets of dropping-wheels with arms to correspond with the number of recesses in the dropping-wheels, so that the ground may always be marked to correspond with the hills. The recesses in the dropping-wheels are made square, so that the grain will not clog in them but will cause the grain to be dropped with regularity and certainty.

$m\ m$ are lines or small ropes attached to the upper ends of the adjustable bars L L, and lead back to the side bars of the machine, as shown in Fig. 1, and where they are secured in suitable staples, and are for the purpose of moving the plow-points J and covering-plates P forward when the lever O is raised.

Thus constructed, the planter is adapted to be used with one horse, and it is cheap, durable, and efficient, and not liable to get out of order.

Having thus described my invention, what I claim as new, and desire to secure by Letters Patent, is—

1. The combination, with a plow-holder, K, of the vertical bars L L, apertured serially, the cross-bar M, and the pins $j$, as described.

2. A corn-planter marker formed of a hub or central bearing and equally distant radial arms, said arms being slotted at $q$ and provided with plates $s$, clamp-screwed adjustably thereto, whereby they may be used on a corn-planter, as described.

3. The combination, with the vertically-adjustable bars L, carrying the blocks K, and plows J P, of the cords $m$, attached to the upper ends of said bars, extending back to the rear of frame and there secured, whereby the driver may throw the plows forward, as described.

PETER RODENBOUR.

Witnesses:
 RICHARD JANSEN,
 R. JANSEN, Jr.